United States Patent [19]

Volk

[11] Patent Number: 4,748,931

[45] Date of Patent: Jun. 7, 1988

[54] UMBRELLA TOP TIMER

[75] Inventor: Anthony J. Volk, Turlock, Calif.

[73] Assignee: Volk Development Company, Turlock, Calif.

[21] Appl. No.: 902,679

[22] Filed: Sep. 2, 1986

[51] Int. Cl.⁴ .................... G01K 11/06; G01K 11/02
[52] U.S. Cl. ............................ 116/218; 116/217; 374/160
[58] Field of Search ............................ 116/216-218; 374/155, 160; 426/88; 99/341-344, 421 TP

[56] References Cited

U.S. PATENT DOCUMENTS

| | | | |
|---|---|---|---|
| 945,978 | 1/1910 | Nielsen et al. | 116/218 |
| 3,656,452 | 4/1972 | Kliewer | 116/218 |
| 3,682,130 | 8/1972 | Jeffers | 116/218 |
| 3,965,849 | 6/1976 | Gee | 116/218 |
| 4,289,088 | 9/1981 | Scibelli | 116/218 |
| 4,421,053 | 12/1983 | Volk | 116/218 |

Primary Examiner—William A. Cuchlinski, Jr.
Assistant Examiner—W. Morris Worth
Attorney, Agent, or Firm—Alvin E. Hendricson

[57] ABSTRACT

A poultry or meat cooking timer has a hollow barrel with an open top slidably receiving a stem with an inner end immersed in a fusible holding material in the barrel to normally hold the stem within the barrel against the force of a spring in the barrel urging the stem outwardly therefrom. The stem has an integral tapered flange thereabout that is force fitted through an inner barrel ridge near the top of the barrel bore and the stem has a large top with a substantially flat surface for engaging a barrel flange for positively sealing the stem and barrel in normal retracted stem position to prevent intrusion of foreign substances into the barrel bore prior to stem release by the fusible material at a predetermined temperature.

6 Claims, 1 Drawing Sheet

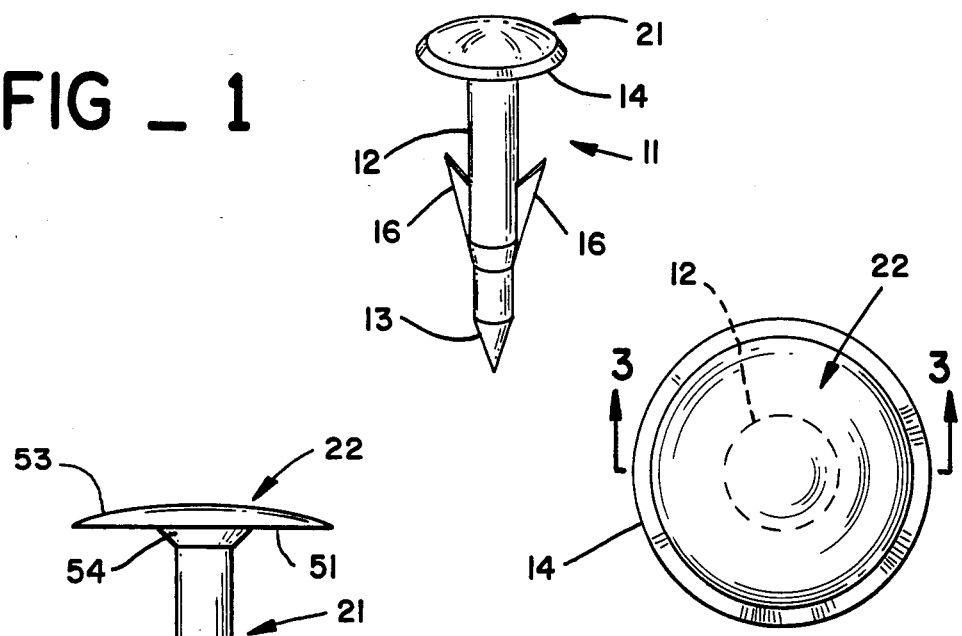
FIG_1
FIG_2
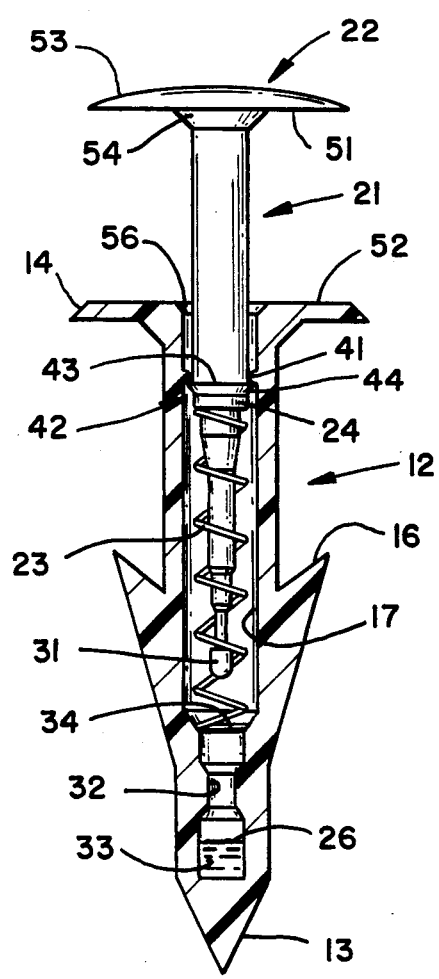
FIG_3
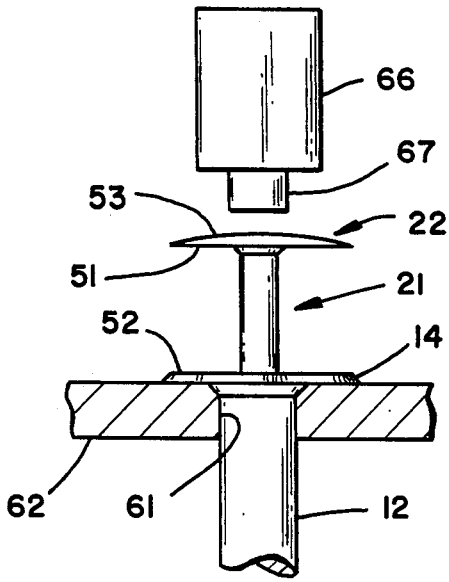
FIG_4

UMBRELLA TOP TIMER

BACKGROUND OF THE INVENTION

There have been developed disposable cooking thermometers particularly useful in cooking meat and poultry to a proper or desire degree of "doneness". One type of such a timer has a spring-loaded stem disposed in a hollow barrel and normally held therein by locking the inner stem end in a fusible material which melts or softens at a desired predetermined temperature. It is desirable, and generally necessary, to ensure retention of the fusible material within the barrel of the timer to prevent possible contamination of the meat or poultry in which the timer is inserted. Various types of sealing arrangements have been proposed to this end and a wide variety of stem locking arrangements have been developed. At least certain of these arrangements and developments have been directed to minimizing the complexity and cost of the timer because this type of timer must necessarily have a low cost inasmuch as it is disposable.

It is also necessary for this type of timer to be highly reliable, for otherwise overcooking or undercooking of meat or poultry will result. Consequently, precise assembly of small parts is required as well as careful control of the properties of the fusible material. Another possible cause of unreliable operation arises from the nature of the environment of assembly and use of the timer. In the processing of poultry, for example, it is common to subject the carcass to successive baths of differing liquids that may include butter or butter substitute, brine, etc. Also in the cooking of poultry there are released juices and fats that may harden during continued exposure to elevated temperatures. The various liquids that may come in contact with a time during the life thereof, as generally noted above, could affect operation of the timer if allowed to enter the barrel of same. Thus it is also important to seal the timer against liquids entering same prior to actuation of the timer to extend the stem thereof. Most timers of this of type do not fully seal the interior thereof from intrusion of foreign substances into the barrel without the provision of additional elements and structure beyond that required for proper operation in a dry environment. This then reduces the overall reliability of disposable cooking thermometers or timers.

SUMMARY OF INVENTION

The present invention comprises an improvement in disposable cooking timers of the pop-up type wherein a stem is moved partially out of a barrel inserted in meat or poultry at a predetermined temperature of the timer as an indication that cooking is completed. Improvements of the present invention include an improved visibility of the actuated condition of the timer, as well as a improved visibility of the timer itself for ready location and removal by the user. Another improvement lies in the assembly of the timer, wherein the structure of the present invention prevents inadvertent damage of the inner end of the stem during assembly and prevents cocking or misalignment of the stem in the barrel. A further improvement lies in the complete sealing of the interior of the timer barrel during assembly and use of the timer to prevent possible intrusion of foreign substances into the timer during processing, preparation and/or cooking of meat or poultry in which the timer is inserted.

The timer of the present invention generally includes a hollow open ended barrel adapted to be inserted into meat or poultry and having a stem disposed within such barrel and normally retained therein against spring pressure by a fusible material engaging the inner stem end and inner barrel opening. A variety of different internal configurations of the timer are possible and references is made to U.S. Pat. No. 4,421,053, and reference cited therein for example, in this respect. In accordance with the present invention the outer stem end is provided with an integral enlargement or umbrella having a generally flat undersurface perpendicular to the stem axis and a generally flat upper surface that may be slightly convex. This umbrella top of the outer stem is adapted to cooperate with a top exterior flange about the barrel and having a flat upper surface perpendicular to the axis of the barrel. The umbrella top of the stem extends a substantial distance radially outward from the stem, in the form of a circle in end view. The stem and barrel are preferably formed of nylon or the like and of different colors such as a white barrel and red stem and top. While such coloring is not necessary, it does improve the visibility of the actuated position of the stem in extended location denoting end of cooking.

Timers of the type improved upon by the present invention commonly included as internal ridge and flange arrangement wherein the stem is assembled in the barrel against the force of a spring therein by physically forcing the stem downwardly into the open barrel end to snap the stem flange through a small ridge about the interior of the barrel. This assembly of the stem and barrel is commonly accomplished by placing the barrel in a retainer, inserting the stem with a spring about same and applying a force as by an air cylinder to the outer end of the stem. Prior timers of this type with a small stem end may be easily tilted or cocked during the foregoing operation so that they bind in the barrel and may not later slidably engage same for extension when released by the fusible material. Furthermore, application of this force, as by an air cylinder or the like, may press the stem too far into the barrel to then damage the inner stem end as by bending same. The present invention, by the provision of the enlarged relatively flat upper surface of the outer stem end, provides for substantially automatic alignment of the stem with the barrel when the stem is engaged by the piston of an air cylinder or the like, and furthermore, engagement of the under surface of the outer stem end with the upper surface of the barrel flange provides a positive stop whereby the stem cannot be forced too far into the barrel to possible damage the inner stem end.

A further feature of the present invention lies in the complete sealing of the interior of the timer at the time of assembly by positive engagement of the enlarged stem end with the barrel flange at the facing flat surfaces thereof to produce a tight seal to prevent the entry of foreign substances into the barrel about the stem. It is noted in this respect that the stem and barrel are assembled with the fusible material within the barrel being in a molten state, and this material is solidified before the stem is released from the pressure applied by the air cylinder or the like employed in assembly. Thus a very tight fit of the under surface of the outer stem end with the upper surface of the barrel flange is achieved and these tightly engaging mating surfaces then prevent liquids or the like from seeping into the interior of the barrel.

BRIEF DESCRIPTION OF DRAWINGS

The present invention is illustrated as to a particular preferred embodiment in the accompanying drawings, wherein:

FIG. 1 is a side elevation view of a timer in accordance with present invention;

FIG. 2 is a top plan view of the timer of FIG. 1;

FIG. 3 is a central longitudinal sectional view of the timer of FIG. 1 in extended or actuated position and taken in the plane 3—3 of FIG. 2; and FIG. 4 is a schematic illustration of the assembly of stem and barrel of the timer of FIG. 1.

DESCRIPTION OF PREFERRED EMBODIMENT

The present invention provides an improvement in a disposable cooking thermometer and, referring to FIG. 1 of the drawings, there will be seen to be shown such a thermometer or timer 11 generally including a barrel 12 having a pointed lower end 13 and a flange 14 about the upper end thereof. The barrel is provided with exterior barbs 16 for retaining the timer in the body of meat or poultry in which it may be inserted by the point 13. Commonly the timer is inserted in meat or poultry so that the barrel flange 14 rests against the exterior surface of same.

The timer 11 also includes a stem 21 having an enlarged upper end somewhat in the form of an umbrella 22. The stem 21 fits into a bore 17 of the barrel 12 in slidable relation therein and a spring 23 is disposed about the stem 21 beneath a flange 24 about the stem in spaced relationship to the umbrella 22. The length of the stem 21 from the underside of the umbrella 22 to the inner end of the stem is slightly less than the distance from the top of the barrel flange 14 to the inner end of the barrel bore 17. Thus the stem is adapted into fit entirely within the bore 17 of the barrel 12 and a fusible material 26 is disposed in the inner end of the barrel bore for engaging the stem to normally retain same within the barrel.

The internal configuration of the barrel 12 and the configuration of the lower portion of the stem 21 may be similar to the structure illustrated in my prior U.S. Pat. No. 4,421,053 and to this end the lower end of the stem 21 has a reduced diameter terminating in an enlargement 31 adapted to fit through a small opening 32 in the barrel bore leading to an enlarged chamber 33 containing the fusible material 26. A shoulder 34 is formed about the barrel bore above the opening 32 and spring 23 is disposed about the stem between the underside of the stem flange 24 and the shoulder 34.

With regard to insertion of the stem in the barrel and retention of same it is noted that a small tapered ridge 41 is formed about the interior of the barrel 12 preferably adjacent to the top of the bore 17 therein to define an internal diameter substantially equal to the diameter of the stem flange 24. Atop the stem flange 24 there is provided a radial flange extension 42 having a flat shoulder 43 atop same with a tapered surface 44 extending downwardly from the shoulder to the main portion of the stem flange 24. The diameter of the shoulder 43 on the stem flange 24 is slightly greater than the internal diameter of the bore of the barrel at the ridge 41 thereabout. The stem and barrel are formed of material such as nylon which may be readily injection molded and which is impervious to heat at and above temperatures that may be experienced by the timer in use and which is impervious to materials and substances which may come in contact with the timer during processing of meat or poultry in which the timer may be inserted and also during cooking of such meat or poultry. In addition, the material of the stem and barrel, such as nylon, has a limited resilient deformation under pressure with a "memory" whereby the structures thereof return to original size and shape after such limited deformation. It is thus possible to force the stem into the barrel by limited deflection of the stem flange enlargement 42 and the barrel ridge 41 to press the stem flange enlargement through the ridge 41. Reverse movement of the stem is not, however, possible inasmuch as the flat shoulder 43 on the stem flange enlargement 42 will abutt the underside of the barrel ridge 41 to lock the stem within the barrel.

The present invention provides for a particular relationship between enlarged top 22 of the stem and the barrel flange 14. In this respect it is noted that the diameter of the barrel flange 14 is of the order of two to three times the diameter of the barrel 12 and the diameter of the upper enlarged end 22 of the stem 21 is of the order of the diameter of the barrel flange. The radial extent of the umbrella 22 may, of course, be varied and need not extend all the way out to the edge of the flange 14, however, substantial mating surfaces are provided for good sealing. It will thus be seen that the top of the stem has a substantial diameter to thereby provide a highly visible portion of the stem for maximizing the appearance of the extended position of the stem. This then provides a user of the timer, such a housewife, with a far better view of the position of the stem, which is important in any type of pop up timer and of even greater importance in a two stage timer such as disclosed in my prior U.S. Pat. No. 4,421,053.

In addition to the foregoing, the underside 51 of the stem top 22 is configured to mate with the upper surface 52 of the barrel flange 14. Preferably these surfaces are planar and are disposed perpendicularly to the central longitudinal axis of the stem and barrel, although it is possible to form mating annular grooves and ridges in these surfaces if desired. The stem 21 may also be provided with a taper 54 at the juncture of stem and umbrella, as shown in FIG. 3, and this mates with an annular depression 56 about the top of the barrel bore in order to further improve sealing and alignment of stem and barrel. Note that the taper 54 on the stem fits entirely into the barrel taper 56 to prevent lateral displacement of the stem in the barrel. This configuration provides for mating of the surfaces 51 and 52 which extend a substantial distance radially outward from the stem and barrel bore so as to provide a positive seal about the top of the timer when the stem is fully inserted in the barrel and retained therein by the solidified fusible material 26. This seal prevents the possible intrusion of foreign substances into the bore of the barrel prior to release of the stem 21 by the melting or softening of the fusible material 26 at the predetermined cooking temperature. The timer of the present invention is adapted to undergo a variety of different processes after insertion in the poultry, for example, such as soaking in a variety of liquids, freezing, thawing, basting and cooking. In each of these processes it is possible for liquids, for example, to seep into the interior of the barrel and possibly interfere with ultimate operation of the timer to reduce the reliability of thereof. The structure of the present invention prevents this from happening.

The umbrella or parasol top 22 of the stem 21 hereof is provided with a relatively flat upper surface 53 which may, as illustrated, have a slight curvature. This upper surface 53 is adapted to be engaged by means applying a downward force to the stem during assembly of the timer, and in this respect reference is made to FIG. 4, schematically illustrating a portion of the assembly operation. In assembly, the barrel 12 is firmly held in a upright position as by disposing the barrel through an aperture 61 in a fixed plate 62 with the barrel flange 14 resting upon the upper surface of the plate. The fusible material 26 in the bottom of the barrel bore is heated to melting temperature and the stem 21, with the spring 23 thereabout, is then lowered into the bore of the barrel so that the stem flange enlargement 42 rests upon the ridge 41 about the internal bore 17 of the barrel. In order to force the stem downwardly into the barrel it is necessary to apply a force to the top of the stem and this is commonly accomplished by a pneumatic cylinder 66 having a controllably extensible plunger or piston rod 67 aligned for movement axially of the timer mounted in the plate 62. It will be seen that in this operation, the rod 67 of the cylinder 66 will engage the top surface 53 of the enlarged end 22 of the stem 21. Inasmuch as this top surface 53 is relatively flat and perpendicular to the axis of the stem and thus to the axis of the barrel in its mount, it will be seen that the stem is forced axially downwardly into the barrel without the application of any side forces that might tend to cock or tilt the stem during entry into the barrel. This is in direct contrast to the situation with a small rounded end on the stem 12 wherein the cylinder rod 67 may easily apply lateral forces to the stem in forcing the stem downwardly into the barrel so as to tilt the stem somewhat and to force the stem into cocked relationship with the barrel whereby the stem may be locked into the barrel so that it will not release. In addition, the mating surfaces of the stem end and barrel flange provide a positive stop for movement of the stem into the barrel. This is particularly important to prevent possible engagement of the inner end of the stem with the bottom of the barrel bore that could produce bending of the bottom of the stem so that it would not be able to move upwardly through the constricted opening 32 in the barrel and would thus prevent the stem from being released to move out of the barrel when the fusible material 26 is softened or melted. As previously noted, the length of the stem is fixed during manufacture, as for example, in an injection mold. Likewise, the length of barrel between the upper surface 52 of the flange thereof to the bottom of the barrel bore is fixed in manufacture in the same manner. Thus with the engagement of the surfaces 51 and 52 there will result an exact location of the enlarge stem end 31 within the chamber 32 of the barrel to preclude possible prior art difficulties in assembly that could reduce reliability of the resultant timer. Furthermore the perpendicular relationship of the surfaces 51 and 52 to the axis of the stem and barrel respectively will cause the stem to be automatically righted to coincide the axes of the stem and barrel even if the stem were inadvertently slightly tilted in original insertion in the barrel. Continued forcing of the stem downwardly even in tilted relationship to the barrel will cause the surfaces 51 and 52 to initially engage at one side and continued application of a downward force would cause the stem to be tilted back to align the axis of stem and barrel so that the surface 51 and 52 are in continuous contact over the entire surface areas.

It will be seen from the foregoing that the timer of the present invention provides material improvements over prior art timers, by the provision of particular structures and relationships of structures between stem and barrel particularly at the upper ends thereof. Not only does the present invention provide for improved visibility of the position of the stem with respect to the barrel but there is also herein provided for a positive sealing of the interior of the barrel prior to actuation of the stem to extend therefrom and material improvement in assembly of stem and barrel to prevent relationships which could prevent release of the stem to pop out of the barrel.

Although the present invention has been described above with respect to a single preferred embodiment thereof, it will be apparent to those skilled in the art that modifications and variations are possible within the spirit and scope of the present invention, and thus it is not intended to limit the invention to precise terms of descriptions or details of illustration.

What is claimed is:

1. An improved disposable cooking timer comprising
   a barrel having a hollow interior and adapted to being inserted into an item to be cooked,
   said barrel having a closed inner end and an open outer end with a flange thereabout having an upper surface,
   a stem slidably disposed in said hollow interior of said barrel,
   resilient means urging said stem out of the open end of said barrel, and
   a fusible material having a predetermined melting temperature disposed in the inner end of said barrel in engagement with said stem and barrel for releasably retaining said stem in said barrel against the urging of said resilient means when the item temperature is below said predetermined melting temperature, and
   said stem having an enlarged flat outer end extending radially outward of said stem atop said barrel flange and having an under surface complementary to said upper surface of said barrel flange for mating therewith to seal the interior of said barrel against intrusion by foreign material prior to release of said stem by said fusible material.

2. The timer of claim 1 further defined by
   said barrel flange having a planar upper surface disposed perpendicularly of a major axis of said barrel, and
   the enlarged upper end of said stem having a planar under surface perpendicular to a longitudinal axis of said stem,
   whereby said stem end and barrel flange fit tightly together for sealing the interior of said barrel against intrusion by foreign material prior to release of said stem by said fusible material.

3. The timer of claim 1 further defined by said stem and barrel having interfering limitedly resilient surfaces within said barrel whereby said stem and barrel are force fitted together and said enlarged stem end having a substantially flat upper surface whereby force applied to the enlarged stem end axially of said barrel tends to align said stem and barrel during assembly.

4. The timer of claim 1 further defined by said barrel flange having a diameter of the order of two times the diameter of said barrel and the diameter of the enlarged stem end being substantially of the order of the diameter of said barrel flange.

5. An improved disposable timer comprising
   a barrel adapted to being inserted into an item to be cooked, barrel having a hollow interior and an external flange about an upper open end of said barrel with a substantially flat upper surface, a solid fusible material disposed in said barrel, and a spring loaded stem disposed in said barrel and biased outwardly of said upper open end of said barrel said solid fusible material releasably retaining said stem in said barrel, said stem having an enlarged outer end with a substantially flat under surface adapted to mate with said flat upper surface of said barrel flange for positively sealing the interior of said barrel prior to release of said stem by said fusible material to prevent intrusion of foreign substances into said barrel, said fusible material melting at a predetermined temperature and releasing said stem.

6. The timer of claim 5 further defined by said barrel having a central bore with an internal tapered ridge disposed about said bore, said stem having a tapered flange about same with a slightly greater diameter than the internal diameter of said barrel bore at said ridge, both said barrel and stem being formed of nylon, and said enlarged stem end having a substantially flat upper surface for receiving a downward force during insertion of said stem in said barrel to resiliently compress said ridge and stem flange and to align said stem and barrel during assembly.

* * * * *